July 17, 1951 M. C. TATE 2,561,321
HYDRAULIC WEIGHING CELL
Filed May 21, 1949 2 Sheets-Sheet 1

INVENTOR
MALCOLM C. TATE
BY
ATTORNEY

July 17, 1951  M. C. TATE  2,561,321
HYDRAULIC WEIGHING CELL
Filed May 21, 1949  2 Sheets-Sheet 2

INVENTOR
MALCOLM C. TATE
BY
ATTORNEY

Patented July 17, 1951

2,561,321

UNITED STATES PATENT OFFICE 2,561,321

HYDRAULIC WEIGHING CELL

Malcolm C. Tate, Stamford, Conn., assignor to Baldwin-Lima-Hamilton Corporation, a corporation of Pennsylvania Application May 21, 1949, Serial No. 94,664

5 Claims. (Cl. 137—157)

This invention relates generally to hydraulic weighing and force measuring devices and more particularly to an improved type of load cell for measuring either tension or compression loads.

In weighing and force measuring devices, such as, for instance, a load cell, it is often desirable to have a self-contained unit that is adaptable for measuring both tension and compression loads and that is both rugged in construction and highly sensitive and accurate in performance to meet not only the requirements of ordinary use, as, for example, in materials testing machines, but also those of special application, such as in wind tunnel balances, in transmission and traction dynamometers, for torque and thrust measurement, and for various weighing applications. It is also desirable that such unit be friction-free, be able to withstand substantial off-center or angular loading without appreciable loss in sensitivity or accuracy, and that can be used to measure tension loads without the use of a yoke frame.

An object of my invention is to provide an improved hydraulic load cell that has a high degree of accuracy and sensitivity together with stability against side or off-center loading, while at the same time being rugged, compact and readily adapted to either tension or compression loading.

A further object is to provide a combined tension-compression load cell as aforesaid that has improved preloading means as well as providing a direct and simple arrangement for weighing tension loads and thereby eliminate the need for a yoke during such tension load weighing.

Other objects and advantages will be apparent to those skilled in the art from the following description of the accompanying drawing in which.

Figure 1:
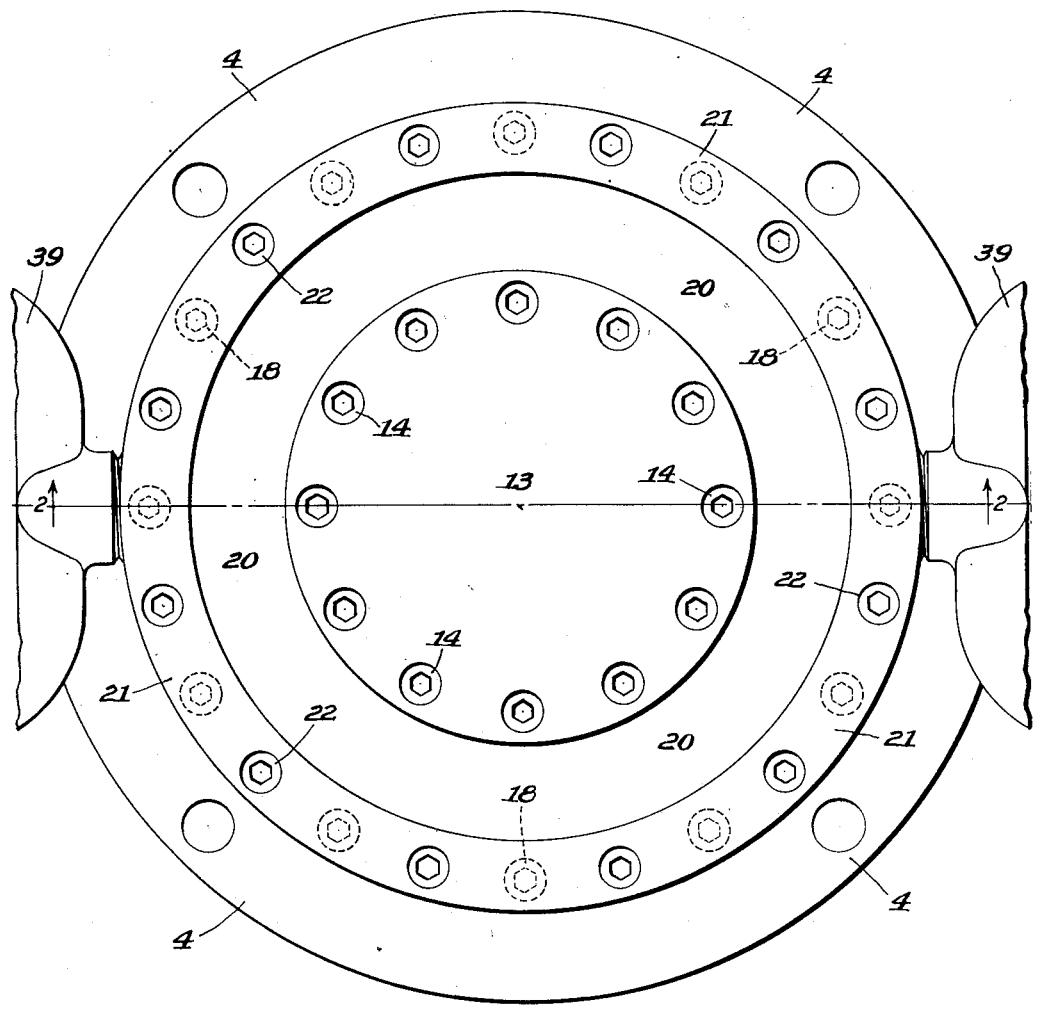
Fig. 1 is a plan view of my improved hydraulic load cell.
Figure 2:
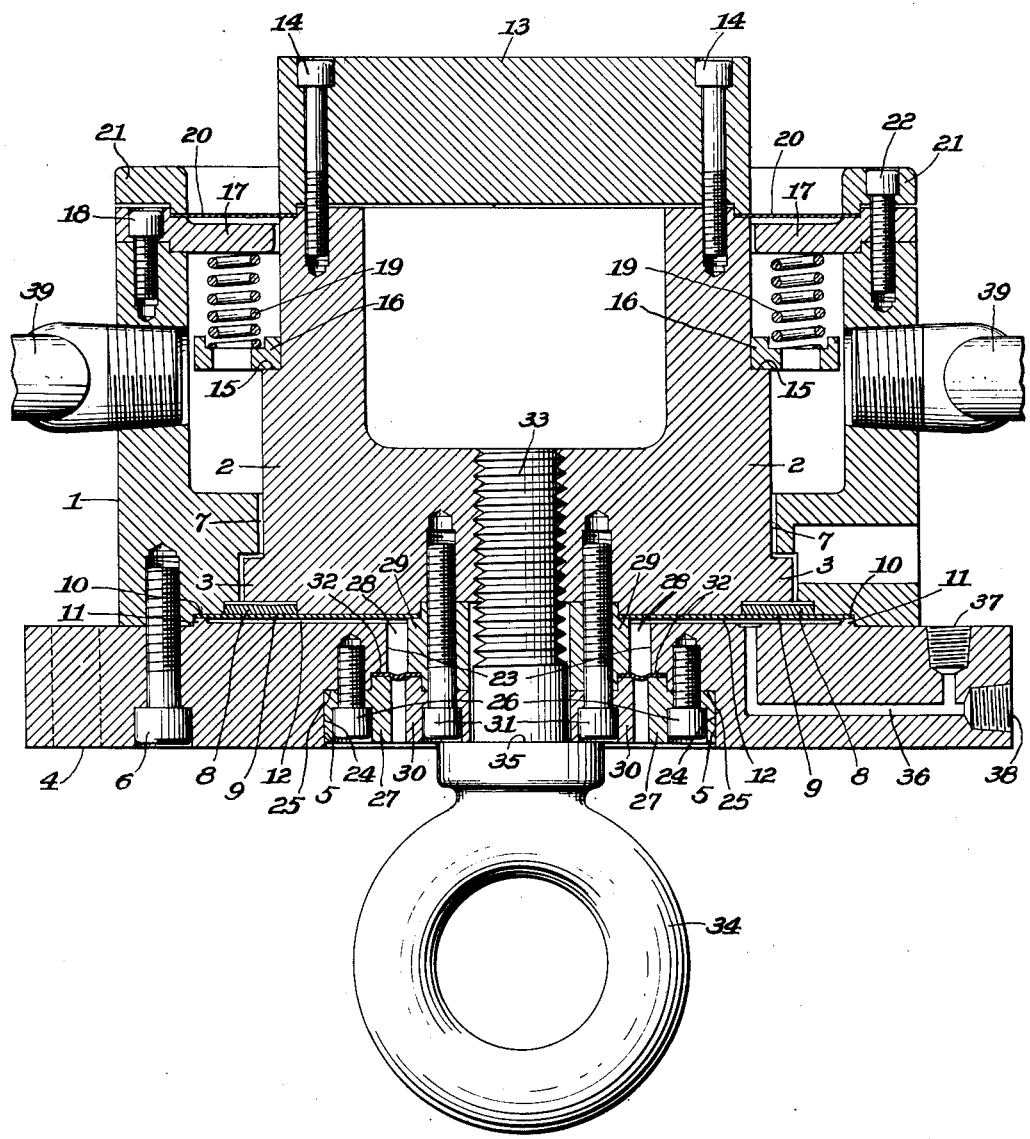
Fig. 2 is a sectional elevational view thereof along the line 2—2 of Fig. 1.

In the particular embodiment of the invention which is disclosed herein merely for the purpose of illustrating one specific form among possible others that the invention might take in practice, I have shown in the drawings a cylinder 1 in which a piston 2, having a flanged lower end 3, is positioned to have slight axial movement. A cylinder head 4, having a concentric opening 5, is secured by bolts 6 to the lower end of the cylinder. Between cylinder 1 and piston 2, suitable clearance spaces 7 are provided to eliminate friction therebetween. To maintain such clearance spaces equal on all sides at all times, a flat bridge ring 8, preferably of flexible steel, is set in annular recesses machined in the lower end of the cylinder and face of the piston of such depth that the outer surface of the bridge ring is flush with the piston face, and of such width that, while the ring may have vertical movement it is without lateral movement. The bridge ring thus spans and closes the lower portion of clearance spaces 7. Against the bridge ring, piston face, and a second recessed portion of the cylinder end, is disposed an annular diaphragm 9 which yieldingly holds bridge ring 8 in said recesses. The outer edge 10 of diaphragm 9 is clamped between said second recessed portion of the cylinder end and an integral ridge 11 on the inner side of cylinder head 4, the inner edge of the diaphragm being held in the manner hereinafter described. A shallow annular fluid-filled space 12 is thus formed between diaphragm 9 and the inner surface of the cylinder head. A compression loading platform 13 is affixed by bolts 14 to the upper end of the piston. On a shoulder 15 of the piston, situated approximately midway of its length, rests a channeled supporting ring 16 and between this ring and an annular cylinder end plate 17, fastened by bolts 18 to the cylinder end, are circumferentially disposed pre-loading compression springs 19. These springs exert a continuous initial downward pressure on the load sensitive elements to increase the sensitivity and accuracy of the cell. An annular flexible stay-plate 20 maintains the upper end of the piston axially aligned with the cylinder while allowing axial movement thereof, its inner edge being clamped between the piston end and loading platform 13 and its outer edge held between annular end plate 17 and a clamping ring 21 secured to the cylinder by bolts 22.

To enable the unit to be used for measuring tension loads without the aid of a yoke frame, I utilize the concentric openings of cylinder head 4 and of annular diaphragm 9. Concentric opening 5 of the cylinder head is provided with at least two bores 23 and 24 of different diameters to provide a shoulder 25, and against this shoulder and secured thereto by bolts 26 is a clamping ring 27. Also within concentric opening 5 and separated from bore 23 by an annular fluid-filled space 28, in communication with shallow fluid-filled space 12, is a diaphragm clamping ring 29 let into a concentric recessed portion of the piston face and formed to clamp the inner edge of diaphragm 9 against the piston face. Thus mounted, diaphragm 9 prevents fluid leakage from shallow space 12 while allowing free axial movement of the piston. Against the outer end of clamping ring 29 and axially aligned therewith is diaphragm clamping ring 30. Both clamping rings 29 and 30 are firmly secured to the piston face by bolts 31. An unsupported free span diaphragm 32, which might also be termed a tension seal, is provided to close annular space 28, its outer edge being clamped between clamping ring 27 and recessed portion of bore 23 and its inner edge between diaphragm clamping rings 29 and 30. This mounting of diaphragm 32 also allows axial movement of the piston while preventing leakage from annular space 28. Thus the fluid of the cell is contained in an annular compartment whose confining walls are diaphragms 9 and 32, the inner surface of cylinder head 4, bore 23 of the cylinder head, and the outer surface of damping ring 29. This fluid which completely fills the compartment is, of course, without flow or volume change. While, for purposes of clarity, I have shown shallow space 12, and therefore the thin layer of fluid filling the same, to be of relatively substantial depth, however, in practice, the depth of this space, and of the fluid layer filling the same, may be actually only 0.030 inch, although such thickness may be more or less in particular constructions of the cell. A shank 33 of a tension eyebolt or hook if desired, having a shoulder 35, is inserted through rings 29 and 30 and supported, through a suitable threaded connection, by the piston face. Formed through the cylinder head is a passage 36 whose inner end connects with shallow space 12 and whose outer end is branched to form two threaded fittings 37 and 38. An external pipe line (not shown) is connected at one end to either fitting 37 or 38 and at the other to an indicating or recording instrument, the fitting not used being normally closed by a removable plug. This unused fitting may be employed to fill the fluid compartment, or another passage similar to passage 36 and located at another point on the cylinder head may be so used. Both passage 36 and the external pipe line are filled with fluid. Removable carrying handles 39 enable the cell to be conveniently transported manually from place to place.

*Operation.*—In making compression measurements, eyebolt 34 is unscrewed from the piston face and the unit placed on a flat surface with its cylinder head serving as a base. Both clamping ring 27 and eyebolt support ring 30, being recessed in concentric opening 5, cannot come into contact with this flat surface at any time. When the load is applied to compression loading platform 13, piston 2, clamping rings 29 and 30, constituting the load sensitive elements, are depressed, causing diaphragm 9 also to be depressed and to exert instant pressure on the fluid layer within shallow space 12. The hydraulic pressure thus created in the fluid layer is immediately transmitted through passage 36 and the attached external pipe line to the indicating or recording instrument which may be calibrated in terms of the force applied. While the amount of piston deflection may vary according to different constructions of the cell, its movement in any case would be extremely small, being in most instances less than 0.005 inch even under full load. Since the acting area of the cell, which is equal to the acting area of the mean diameter of bridge ring 8, minus the area of the mean diameter of annular tension free span diaphragm 32, remains unchanged during loading, such fluid pressure is always proportional to load. Preloaded springs 22 are made to exert such an initial pressure on the fluid that any increased load on the piston is instantly transmitted to the indicating or recording system as a pressure change.

When the cell is used to measure tension loads, eyebolt 34 is screw-threaded into the piston face so that its shoulder 35 bears firmly against the end of clamping ring 30, thus helping to reduce the bending moment in the eyebolt which might be caused by a non-central or angular tension thereon. The unit is then so rigged that, while the unit itself is supported by a flat surface, eyebolt 27 hangs free to receive the load. The tension load applied to eyebolt 34 acts upon piston 2, diagrahm 9, and upon the fluid in shallow space 12 of the fluid compartment in the same manner as when the load is applied to compression loading platform 13. In the event of non-central or angular loading, in either tension or compression, annular stay-plate 20 rigidly holds the upper end of piston 2 and loading platform 13, secured thereto, against lateral movement while permitting axial movement of the piston, and bridge ring 8 holds the lower end of the piston in axial alignment with the cylinder while deflecting elastically to allow axial motion of the piston. In the case of a vibratory load applied either to the compression loading platform or to the tension eyebolt, the pressure at the cell varies with the load but the pressure at the end of the external pipe line connected to the indicator or recorder is the pressure of the mean value of the load, causing the indicating or recording instrument to reflect the average vibratory load, which is frequently more desirable than the instantaneous value thereof.

From the disclosure herein, it is seen that I have provided a highly sensitive, accurate and rugged weighing and force measuring device that can be used to measure both tension and compression loads, that does not require a yoke frame for tension loads, that will withstand substantial side, angular, or off-center loading without appreciable loss in sensitivity or accuracy, that is normally pre-tensioned to exert a continuing load on the load sensitive elements to increase the sensitivity and accuracy thereof and whose fluid is sealed into the unit and has no flow.

It will, of course, be understood by those skilled in the art that various changes may be made in the construction and arrangement of parts without departing from the spirit of the invention as set forth in the appended claims.

I claim:

1. A force measuring device, comprising, in combination, a cylinder, a piston adapted to have axial movement within the cylinder, a cylinder head having an opening substantially coaxial with the cylinder axis, an annular diaphragm interposed between the piston and cylinder to form a flexible fluid wall, an annular ring for clamping said diaphragm against said piston, a second annular diaphragm interposed between said cylinder head and annular ring, a second annular ring for clamping the second diaphragm against the first mentioned annular ring, whereby a fluid pressure chamber is formed between the first diaphragm and the cylinder head, means formed in said piston adapted to receive tension supporting means extending through said annular rings, and an external fluid connection with said chamber for transmitting fluid pressure produced therein in response to the force applied to the piston.

2. A force measuring device comprising, in combination, a cylinder, a piston adapted to have axial movement within the cylinder, a cylinder head axially spaced from the piston and having an opening substantially coaxial with the cylinder axis, means forming a fluid pressure annular chamber in said axial space including an annular diaphragm interposed between the piston and cylinder to form a flexible fluid wall for said chamber, means formed in said piston adapted to receive tension supporting means that may extend through said cylinder head opening, an external fluid connection with said chamber for transmitting fluid pressure produced therein in response to a force applied to the piston, an annular stay-plate interposed between said piston and cylinder in axially spaced relation to the annular diaphragm, preloading spring supporting means carried by said piston and by said cylinder, and preloading springs disposed between said spring supporting means to impose a predetermined initial load on the fluid in said chamber.

3. A force measuring device comprising, in combination, a cylinder, a piston adapted to have axial movement within the cylinder, a cylinder head axially spaced from the piston and having an opening substantially coaxial with the cylinder axis, means forming a fluid pressure annular chamber in said axial space including an annular diaphragm interposed between the piston and cylinder to form a flexible fluid wall for said chamber, means formed in said piston adapted to receive tension supporting means that may extend through said cylinder head opening, an external fluid connection with said chamber for transmitting fluid pressure produced therein in response to a force applied to the piston, and the upper end of the piston being provided with a loading platform adapted to transmit compression loads to the fluid in the chamber.

4. The combination set forth in claim 1 further characterized by the provision of tension supporting means having a shoulder adapted to be forced against the second annular ring when the tension supporting means is connected to the piston whereby bending of the tension supporting means is resisted when subjected to an eccentric tension load.

5. The combination set forth in claim 1 further characterized in that the second annular ring is axially recessed so that the piston may have free axial movement above a suitable surface upon which the cylinder head may be supported.

MALCOLM C. TATE.

REFERENCES CITED

The following references are of record in the file of this patent:

UNITED STATES PATENTS

| Number | Name | Date |
|---|---|---|
| 123,621 | Duckham | Feb. 13, 1872 |
| 1,023,154 | Kennerson | Apr. 16, 1912 |
| 2,349,228 | Wolff | May 16, 1944 |

FOREIGN PATENTS

| Number | Country | Date |
|---|---|---|
| 681,932 | France | of 1930 |